United States Patent [19]

Matsui

[11] Patent Number: 4,616,396

[45] Date of Patent: Oct. 14, 1986

[54] WIRE LENGTH VARYING DEVICE IN COMBINATION WITH APPARATUS FOR MAKING ELECTRICAL HARNESSES

[75] Inventor: Minoru Matsui, Okayama, Japan

[73] Assignee: Nippon Acchakutansi Seizo Kabushiki Kaisha, Osaka, Japan

[21] Appl. No.: 675,408

[22] Filed: Nov. 27, 1984

[30] Foreign Application Priority Data

Nov. 29, 1983 [JP] Japan ............................... 58-225012

[51] Int. Cl.[4] ........................ B23P 19/60; H01R 43/04

[52] U.S. Cl. ................................ 29/566.1; 29/33 M; 29/564.8; 29/749; 29/857; 81/9.51

[58] Field of Search ................ 29/747, 748, 749, 753, 29/755, 863, 866, 857, 566.1, 566.3, 564.1, 564.4, 33 M; 81/9.51

[56] References Cited

U.S. PATENT DOCUMENTS

| | | | |
|---|---|---|---|
| 3,939,552 | 2/1976 | Hart et al. | 81/9.51 X |
| 4,043,034 | 8/1977 | Sucheski et al. | 29/747 |
| 4,126,935 | 11/1978 | Rhines et al. | 29/749 X |
| 4,136,440 | 1/1979 | Brandewie et al. | 29/749 X |
| 4,253,222 | 3/1981 | Brown et al. | 29/749 X |
| 4,275,619 | 6/1981 | Shimizu | 29/566.1 |
| 4,370,806 | 2/1983 | Funcik et al. | 29/749 |
| 4,377,898 | 3/1983 | Hara | 81/9.51 X |
| 4,404,743 | 9/1983 | Brandewie et al. | 29/749 X |
| 4,495,682 | 1/1985 | Matsui et al. | 29/566.3 X |

*Primary Examiner*—Gil Weidenfeld
*Assistant Examiner*—Glenn L. Webb
*Attorney, Agent, or Firm*—Antonelli, Terry & Wands

[57] ABSTRACT

A wire length varying device for an apparatus for making electrical harnesses, with the device comprising a tension pulley unit located on a wire supply path. The tension pulley unit constantly urges the individual wires to return in a counterflow direction. A return preventive device selectively stops the wires from returning under an urging provided by a moving chuck, thereby enabling the stopped wires to slacken by the respective selected lengths. Thus, the lengths of the connector-free terminal end portions of the wires are differentiated as desired.

1 Claim, 10 Drawing Figures

2
2A
3
5
12
21
23
24
26
31
32
33
34
35
36
45
51
52
53
54
55
56
57
58
59
60
L
W
ℓ1
21~26

WIRE LENGTH VARYING DEVICE IN COMBINATION WITH APPARATUS FOR MAKING ELECTRICAL HARNESSES

The present invention relates to a wire length varying device for use in an apparatus for making electrical harnesses, with the apparatus being adapted to affix one or more electrical connectors to both or one terminal end or in a middle portion of insulation clad wires cut to a desired length.

Various types of electrical harnesses are provided which include, for example, a harness having connectors at both terminal ends, a harness having a connector at only one terminal end, a harness having connectors in a middle portion and the other at both or one terminal end.

Of harnesses having connector-free terminal ends there are at least two types, namely, a harness with connector-free terminal ends terminating in the same plane, wherein the lengths of the wires are the same, and a harness with connector-free terminal ends terminating at diffferent points, wherein the lengths of the wires are different, so as to adapt the wires for ready connection to electrical elements or devices.

Various devices have been proposed for varying the lengths of connector-free terminal ends such as, for example, a roller system under which the wires are fed differently in feeding distances by a pair of opposing rollers, and a rod system under which the wires are individually pushed downward by a rod so as to differentiate the lengths thereof.

In the proposed roller system and rod system, the amount of wire feed and of slackened wires is necessarily changed thereby resulting in a damaging of insulating coverings. Particularly, in the roller system, feed error tends to occur due to changes in the hardness of the insulating coverings or diameters of the wires caused by a rise or fall of temperature and, this is especially true when the wires are extremely fine. Under the proposed roller or rod system it is difficult to secure wire lengths exactly as desired. In addition, the production cost is high, and the maintenance is difficult.

The present invention is directed to solve the above-noted problems, and has for its object the provision of a wire length varying device which is readily incorporated in an automatic apparatus for making electrical harnesses, thereby enhancing the efficiency of the automatic connector-to-wire assembling operation.

Another object of the present invention is to provide a wire length varying device which utilizes the movement of wires necessarily occurring in the main assembling apparatus, thereby eliminating the necessity of providing a special complicated length varying device.

A further object of the present invention is to provide a wire length varying device which secures wire lengths as exactly as desired.

Other objects and advantages of the present invention will become more apparent from the following description when taken in connection with the accompanying drawings which show, for the purposes of illustration only, one embodiment in accordance with the present invention.

According to the present invention, there is provided a wire length varying device for use in combination with an apparatus for making electrical harnesses, with the apparatus including a connector attaching device for affixing connectors to wire groups continuously supplied along a wire feed path, a wire length measuring and feeding device including a moving chuck for pulling the wire group, already having the connector thereon, for a distance corresponding to a desired length of an intended electrical harness, and a wire cutting means and an insulating covering stripping means. The cutting and insulator covering stripping means are operable independently of each other. The wire length varying device includes a tension pulley unit located on a wire supply path extending in a wire supplying device communicating with the connector attaching device through the wire feed path. The tension pulley unit includes a plurality of pulleys carried on respective swinging arms, with each pulley being placed on the wire running therethrough such that the pulleys exert their weight on the respective wires so as to urge the same in a downward direction. A return preventive chuck unit individually holds the wire groups, with the chuck unit being located between the tension pulley unit and the wire selecting device. The return preventive chuck unit includes a first means for individually accommodating the wires, and a second means pneumatically operable for selectively holding the individual wires.

In an operation of the apparatus, the moving chuck pulls the wire group already having the connector thereon for a distance corresponding to a desired electrical harness and then returns in a counter flow direction along the wire feed path, thereby allowing the wires therein to return under the additional urge provided by the tension pulleys, and, in the course of the returning, the wires are selectively prevented from further returning by the first means in accordance with the distances over which the moving chuck is returned, thereby enabling the wires to slack in between the moving chuck and the connector attaching position, and causing the cutting means and stripping means to work on respective terminal ends of the wires, and finally causing the moving chuck to advance so as to stretch the wires from the slackened states.

The invention will be more particularly described with reference to the drawings, in which.

Figure 4A:
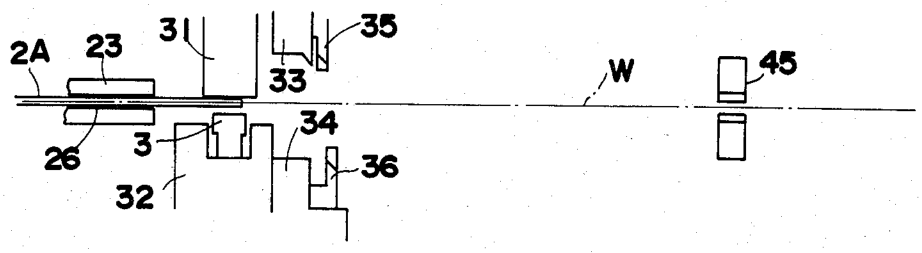
Figure 4B:
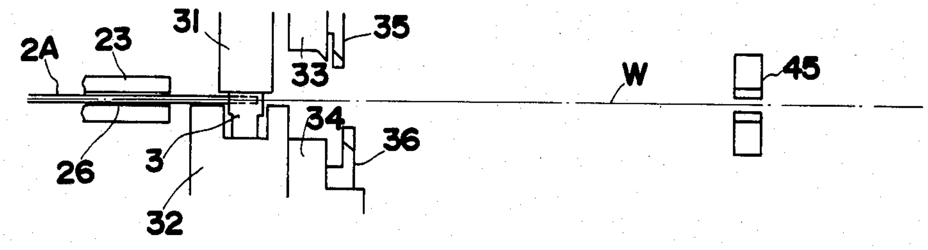
Figure 4C:
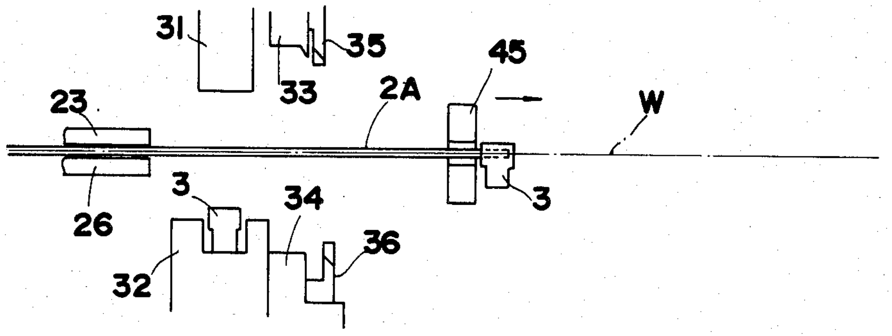
Figures 5A, 5B, 5C:
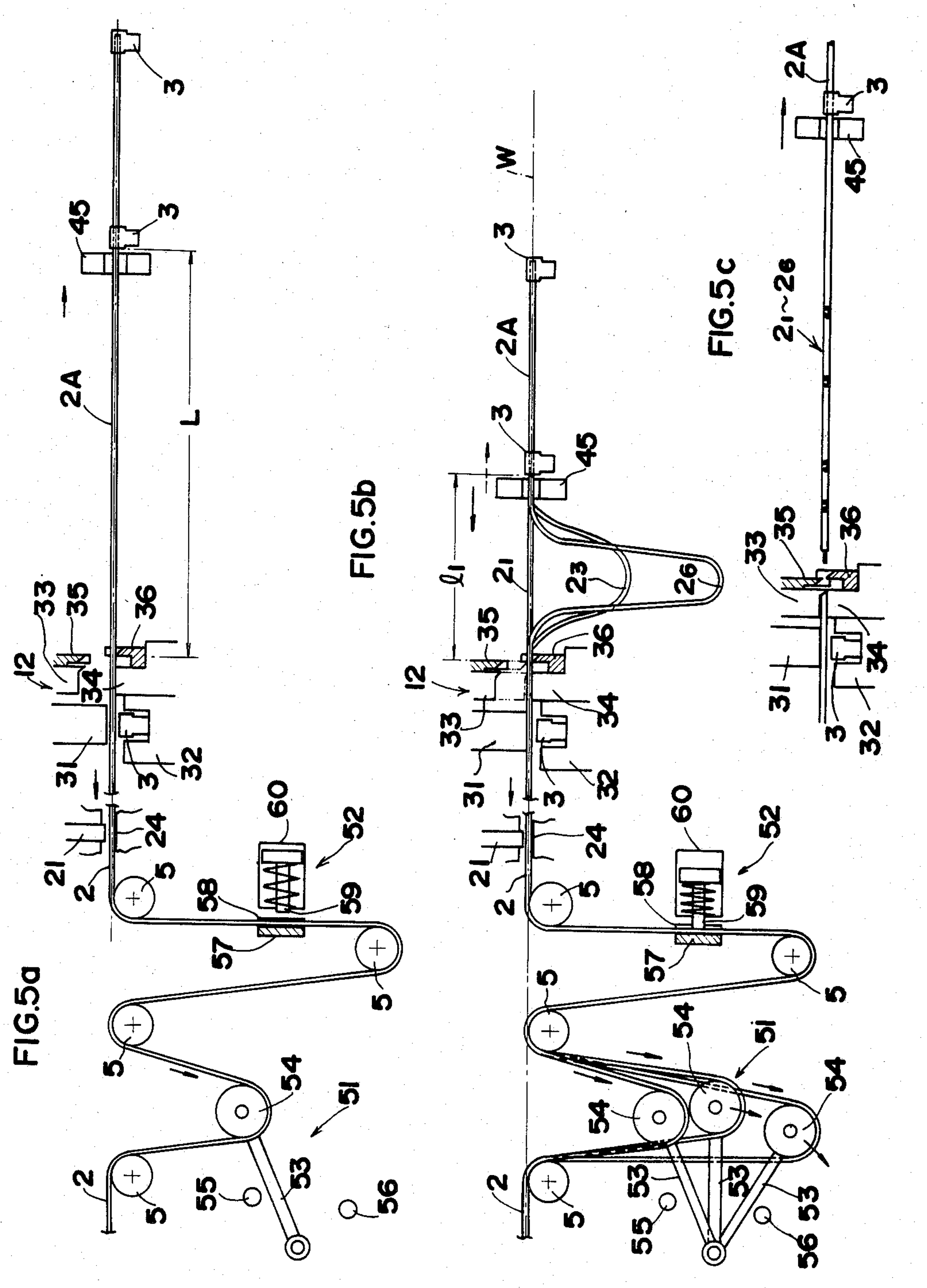
Figure 6:
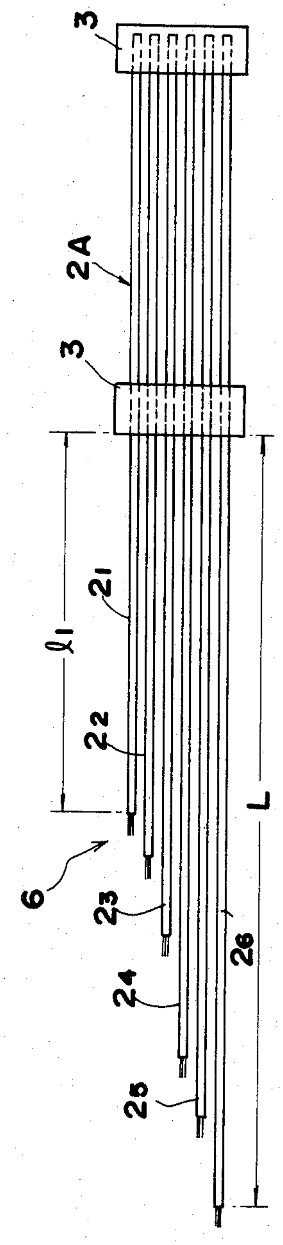

FIGS. 4(*a*) to (*c*) are schematic views examplifying the steps of a connector-to-wire assembling process;

FIGS. 5 (*a*), (*b*) and (*c*) are schematic views exemplifying the steps of varying the lengths of wires; and FIG. 6 is a front view showing a finished electrical harness.

Figure 1:
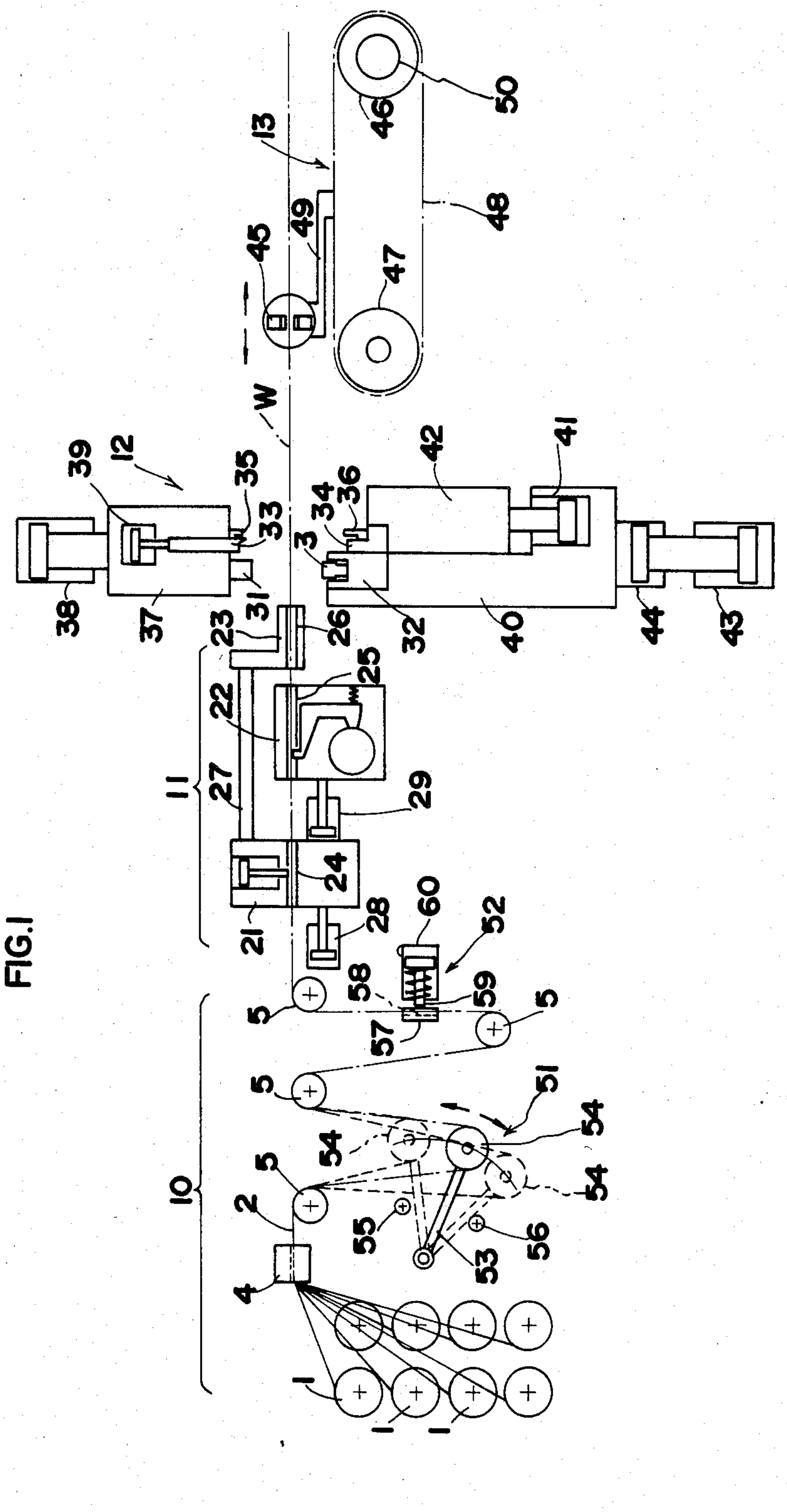
FIG. 1 is a schematic front view of a wire length varying device according to the present invention, in combination with an apparatus for making electrical harnesses.
Figure 2:
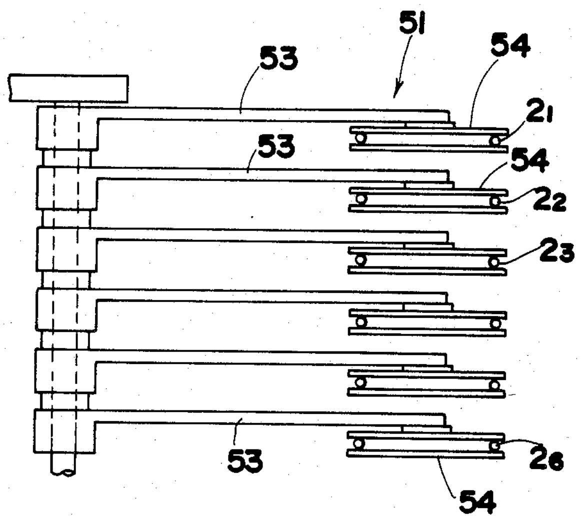
FIG. 2 is a plan view, on an enlarged scale of the wire length varying device of FIG. 1.

Referring now to the drawings wherein like reference numerals are used throughout the various views to designate like parts and, more particularly, to FIG. 1, according to this figure, a wire supplying device 10, a wire selecting device 11, a connector attaching device 12 and a wire length measuring and feeding device 13 are provided, with the wire supplying device 10 including a plurality of reels 1, a wire bundling device 4, guide rollers 5, and a tension pulley unit 51. A plurality of wires are supplied from the reels 1, and fed to the wire selecting device 11 along a wire feed path W via the bundling device 4, guide rollers 5, and the tension pulley unit 51. The wire feed path W extends horizontally and axially of the apparatus. The wire selecting device 12 includes a first chuck 21, a second chuck 22 and a wire guide 23. The first chuck 21 pinches all the wire groups 2 with the second chuck 22 being located adjacent to the first chuck 21, and releasing a wire group 2A from the wire groups 2, with the released wire group 2A being fed to the connector attaching device 12 at which a connector is affixed thereto. The wire guide 23 guides the wire group 2 along the wire feed path W up to a connector attaching position .

The first, second chuck 21 and 22, and the wire guide 23 are provided with guide grooves 24, 25 and 26 in number corresponding to that of the wires in the wire group 2, usually twenty to twenty-four. The grooves 24, 25 and 26 in each guide groove 24, 25 and 26 are spaced from each other, and arranged in parallel with the wire feed path W. The spacing between the adjacent grooves corresponds to the pitch between the slots in the contact. The wires are individually passed through the respective guide grooves 24, 25 and 26, and fed to the connector attaching device 12.

The first chuck 21 and the wire guide 23 are interconnected to each other by.a connecting rod 27, and are reciprocated along the wire feed path W as a unit by a pneumatic cylinder 28. The second chuck 22 is reciprocated along the wire feed path W by a pneumatic cylinder 29 mounted on the first chuck 21. Thus, the second chuck 22 is movable not only by the pneumatic cylinder 28 but also by the pneumatic cylinder 29 along the wire feed path W.

The connector attaching device 12 includes a pair of assembling punch 31 and die 32 arranged on respective sides of the wire feed path W, a pair of cutting punches 33 and die 34, insulating covering strippers 35, 36.

The assembling punch 31 is fixed to a lower end of a slider 37, and lowered to a connector attaching position (as shown in FIGS. 4(*a*) and 4(*b*)) by a pneumatic cylinder 38. The cutting punch 33 and the insulating covering stripper 35 are fixed to a pneumatic cylinder 39 mounted on the slider 37, such that they project toward the wire feed path W. They are operated independently of each other by the pneumatic cylinder 39.

The assembling die 32 is fixed to an upper end of a slider 40, and the cutting die 34 and the stripper 36 are fixed to an upper end of a slider 42 vertically movable by a pneumatic cylinder 41 independently of the slider 40.

The slider 40 is vertically reciprocated in two steps by means of pneumatic cylinders 43, 44. In the first step, the assembling die 32 is raised from the lower position shown in FIG. 1 up to a connector attaching preparatory position (FIG. 4(*a*)) by means of the pneumatic cylinder 43, and in the second step, the die 32 is raised to the connector attaching position shown in FIG. 4(*b*) by the pneumatic cylinder 44.

The connectors 3 are supplied by a conventional supplying means, such as a hopper, a conveyor or a magazine.

The wire length measuring and feeding device 13 includes a moving chuck 45, which is reciprocally movable along the wire feed path W, and which pinches a wire group 2A already having the connector 3 thereon thereby pulling it out for a distance corresponding to a desired length of the intended electrical harness.

The moving chuck 45 is jointed to an arm 49, fixed to a chain 48 supported on a driving sprocket 46 and a follower sprocket 47, with the chain 48 being rotated in a clockwise or counterclockwise direction by a reversible electric d.c. motor 50. By operating the motor 50, the chain 48 is reversibly rotated, thereby causing the moving chuck 45 to move foward and backward along the wire feed path. By switching off the motor 50, the moving chuck 45 is stopped at any desired position.

The wire length varying device includes the tension pulley unit 51 and a return preventive chuck 52 for preventing the wires from returning in a counter-flow direction. The counter-flow direction means a direction contrary to the supplying direction of wires.

The tension pulley unit 51 includes a plurality of tension pulleys 54 supported on swinging arms 53, with the unit being situated between the guide rollers 5. The tension pulleys 54 are individually placed on the wires passing therethrough such that the pulleys exert their weight on the wires $2_1$, $2_2$, $2_3$ . . . as best shown in FIG. 1. Thus, the wires 2 undergo a downward urge under the weight of the tension pulleys 54. The swinging movement of each tension pulley 54 is limited upward and downward by stops 55 and 56. The tension pulley unit 51 is not not for the wire length varying device but for the wire supplying device 10, that is, as a component of the wire supplying device 10, so as to feed the wires under tension, which is essential to conduct a smooth connector-to-wire assembling operation.

Figure 3:
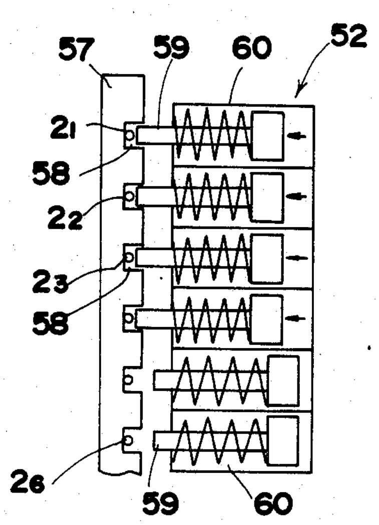
FIG. 3 is a plan view of a return preventive device.

Referring to FIGS. 1, 3, the return preventive chuck 52 includes a guide bar 57 having guide grooves 58 in which the wires $2_1$, $2_2$, $2_3$ . . . are individually accommodated, and presser rods 59 for retaining the respective wires $2_1$, $2_2$, $2_3$ . . . in the grooves 58 by pneumatic cylinders 60, wherein the presser rods are independently operated. The return preventive device 52, prevents each wire in the groove 58 from returning in a counter-flow direction, with the device 52 being situated along the wire supplying path toward the connector attaching device 12.

As shown in FIG. 4, the wire group 2 is fed to the connector attaching device 12 through the wire guide 23, and terminal ends thereof are cut into alignment. The wire group 2A is then returned by the first chuck 21 until the cut end faces are situated at the connector attaching position. At this time the second chuck 22 is operated to withdraw the wire groups other than a selected wire group 2A to which connectors are to be affixed. The other wire groups are kept away from the connector attaching position. (FIG. 4(*a*)) At this stage, the assembling punch 31 is lowered to the connector attaching position, and the mating die 32 is raised to the attaching preparatory position.

Then, the die 32 is raised to the connector attaching position shown in FIG. 4(*b*), at which the punch 31 and die 32 cooperate to attach the connector 3 to the terminal ends of the wire group 2A.

As soon as the attaching operation is finished, the punch 31 and die 32 are separated, and the moving chuck 45 comes to the connector attaching position to pinch the wire group 2A. As the moving chuck 45 advances along the wire feed path W, the wire group 2A is pulled out of the connector attaching position until it is stopped at a desired position. (FIG. 4(*c*)) In this situation the first chuck 21 is free from the wire group 2A. When two or more connectors are to be attached to the wire group 2A, the second connector 3 is supplied.

In the illustrated embodiment, the wire group 2A consists of six wires, denoted by $2_1$ to $2_6$, which have been selected from the main wire group 2.

As shown in FIG. 5(*a*), when the wire length varying process is to be initiated, the assembling punch 31 is lowered to the connector attaching position, the mating die 32 is raised to the attaching preparatory position, and the cutting die 34 and the stripper 36 are raised to their operating positions.

First, the moving chuck 45 pulls the wire group 2A already having the connector 3 out of the connector attaching position. Then, it further pulls the wire group 2A for a distance L corresponding to the longest wire $2_6$. (FIG. 4(*a*)) In this situation the wires in the group 2 staying in the supply side undergo a returning urge under the weight of the pulleys 54, and the wire group 2A returned by the moving chuck 45 is kept tensioned.

In the return preventive device 52, the pneumatic cylinder 52, corresponding to the longest wire $2_6$, is operated causing the mating rod 59 to stop the wire $2_6$ from returning in the counter-flow direction. At this stage, the moving chuck 45, holding the wire group 2A, is further returned in the counter-flow direction along the wire feed path (W). As the moving chuck 45 is returned, the wires $2_1$ to $2_5$ kept free from the respective rods 59 are individually returned, whereas, the wire $2_6$ slackens between the moving chuck and the connector attaching device 12, keeping the length L. The pneumatic cylinders 60 are successively operated in accordance with the distances for which the moving chuck 45 is withdrawn, thereby differentiating the points at which the wires $2_1$ to $2_5$ are individually held by the respective rods 59 against their returning in the counter-flow directions. As a result, they slacken with the lengths of $l_1$ to $l_5$, wherein the $l_1$ to $l_5$ are obtained by subtracting from the L a distance over which the moving chuck 45 has returned until the respective wires are no longer returned because of being held by the respective rods 59.

As shown in FIG. 5(*b*), the moving chuck 45 stops after having withdrawn up to the shortest distance $l_1$ for the wire $2_1$ to the connector attaching device 12. At this stage the first chuck 21 is operated to pinch the whole wire group 2 including the wires $2_1$ to $2_6$ in the wire group 2A.

Then, the cutting punch 33 and the stripper 35 are lowered to cut the wires $2_1$ to $2_6$, as shown by phantom lines in FIG. 5(*b*). Again, the moving chuck 45 is advanced along the wire feed path W, thereby stretching the wires $2_1$ to $2_6$ from their slackened states. Then, the terminal end portions are stripped of their insulating coverings by means of the strippers 35, 36 as shown in FIG. 5(*c*). In this way an electrical harness 6 shown in FIG. 6 is obtained. The harness 6 is provided with two connectors 3 one at the terminal ends and the other in a middle portion thereof. It consists of six wires whose connector-free terminal ends terminate at different points, which means that the lengths of the wires are different. The insulating coverings at the connector-free terminal ends are removed from ready connection to electrical elements or devices. When electrical harnesses of the same type are to be mass produced, the aforementioned procedure is repeated.

As evident from the foregoing description, according to the present invention a wire length varying device utilizes the movement of the moving chuck essentially provided in the main assembling apparatus, thereby eliminating the necessity of providing a special complicated mechanism like the known wire length varying devices. The wire length varying device of the invention secures wire length exactly as desired by the use of specially arranged tension pulleys. Unlike the known length varying devices, the production costs are reduced because of the simplified structure and trouble-free maintenance.

What is claimed is:

1. A wire length varying device for use in combination with an apparatus for making electrical harnesses, wherein the apparatus includes a connector attaching device for affixing connectors to wire groups continuously supplied along a wire feed path; a wire length measuring and feeding device including a moving chuck for pulling the wire group already having the connector thereon for a distance corresponding to a desired length of an intended electrical harness; and a wire cutting means and an insulating covering stripping means, said wire cutting means and said insulating covering striping being operable independently of each other, the wire length varying device comprising:

a tension pulley unit located on a wire supply path extending in a wire supplying device communicating with the connector attaching device through the wire feed path, the tension pulley unit including a plurality of pulleys carried to respective swinging arms mounted on a support means of the length varying device, each pulley being placed on the wire running therethrough such that the pulleys exert their weight on the respective wires so as to urge the same in a downward direction;

a return preventive chuck unit for holding the individual wire groups, the return preventive chuck unit being located on the support means between the tension pulley unit and a wire selecting device receiving wires from the wire supplying device, the return preventive chuck unit includes first means for accomodating the individual wires, and second pneumatically operable means for selectively holding the individual wires;

whereby upon an operation of the apparatus, the moving chuck pulls the wire group already having the connector thereon for a distance corresponding to a desired electrical harness, and is then caused to return in the counter-flow direction along the wire feed path, thereby allowing the wires therein to return under the additional urge provided by the tension pulleys, and in the course of returning by the first means in accordance with the distances over which the moving chuck is returned, thereby enabling the wires to slacken between the moving chuck and the connector attaching position, and causing the cutting means and the stripping means to work on the respective terminal ends of the wires, and finally causing the moving chuck to advance so as to stretch the wires from the slackened states.

* * * * *